US006214452B1

(12) United States Patent
Albrecht et al.

(10) Patent No.: US 6,214,452 B1
(45) Date of Patent: Apr. 10, 2001

(54) FOILS AND COATINGS

(75) Inventors: Rotraut Albrecht, Wolfen; Sivio Boettcher, Langeneichstaedt; Gernod Haerter, Bobbau; Peter Pawlak, Zscherndorf; Heinrich Erich Schwartze, Gronau; Heike Zuleg, Wolfen, all of (DE)

(73) Assignee: Gesellschaft fuer Spezialfolien-Entwicklung m.b.H., Wolfen (DE)

( * ) Notice: Subject to any disclaimer, the term of this patent is extended or adjusted under 35 U.S.C. 154(b) by 0 days.

(21) Appl. No.: 09/276,272

(22) Filed: Mar. 25, 1999

(30) Foreign Application Priority Data

Mar. 26, 1998 (DE) .............................. 198 13 229

(51) Int. Cl.$^7$ ...................................... B32B 7/02
(52) U.S. Cl. ...................... 428/220; 428/327; 428/532
(58) Field of Search ................... 428/220, 327, 428/532, 213, 218; 524/530, 537

(56) References Cited

U.S. PATENT DOCUMENTS

| | | | |
|---|---|---|---|
| 3,312,641 | * 4/1967 | Young | 260/17.4 |
| 3,778,392 | 12/1973 | Hughes | 260/17.3 |
| 3,850,652 | 11/1974 | Asaka et al. | 106/197 R |
| 4,281,111 | * 7/1981 | Hunt et al. | 536/111 |

FOREIGN PATENT DOCUMENTS

| | | | |
|---|---|---|---|
| 1745680 | 9/1971 | (DE) . | |
| 0417828 | 3/1991 | (EP) | C08L/3/08 |
| 1075002 | * 7/1967 | (GB) | C08F/29/30 |
| WO 90/14388 | 11/1990 | (WO) | C08L/3/02 |

\* cited by examiner

Primary Examiner—Bruce H. Hess
Assistant Examiner—B. Shewareged
(74) Attorney, Agent, or Firm—Karl Hormann

(57) ABSTRACT

The invention relates to a biodegradable foil made from a low salt content hydroxypropylether solution of a starch containing at least 70% amylose having a median molecular weight from between about $10^5$ to about $2\times10^7$, a polydispersity from about 2 to about 8, a degree of substitution from about 0.1 to about 0.5, and a substantially equal substituent distribution between $C_2/C_3$ and $C_6$ bond sites in a glucose molecule and a density of about 1.3 g/cm$^3$. The foil is of a thickness between about 20 μm and 200 μm and has a light transmissivity, at light of a wavelength of about 560 nm of in excess of 80%. The foil is especially suitable for printing, writing and deep drawing as well as for projection slides.

12 Claims, No Drawings

FOILS AND COATINGS

BACKGROUND OF THE INVENTION

1. Field of the Invention

The invention, in general, relates to films or foils and products made from, or incorporating, foils or coatings and, more particularly, to such products made from starch or amylose derivatives of the kind useful in an office environment or as data carriers or image surfaces as well as teaching and learning materials such as, for instance, overhead projection slides, printing or drawing sheets, transparent folders or windows of envelopes. Other fields of application relate to the manufacture and refinement of special papers and to packaging materials as in see-through packages or parts of packages or as laminates on other web materials. Further fields of application of the foils here under consideration are in food packaging and agriculture.

2. The Prior Art

Films, foils and foil products, hereinafter sometimes collectively referred to as foils, are produced in huge quantities. Since a considerable amount of such foils are intended for one-time use only and since, following such use, they must be disposed, there is an increased demand for foils which can either be recycled or which are biodegradable. However, recycling is made difficult by the fact that these foils, because of their great variety, can often not be distinguished and sorted out by laymen for subsequent appropriate recycling processes. An alternative to such foils would be foils which are fully bio-degradable or compostible within a reasonably short time. Such foils would very likely eventually replace those foils which are not biodegradable or compostible, such as polyvinyl chloride, polystyrene, polyethylene, etc. provided they could be made to exhibit similar properties, especially in terms of transparency and mechanical strength and stability.

In the past, numerous experiments have been conducted in which starch served as the base or raw material for producing bio-degradable films or foils. Thus far, however, products made from pure starch have not been able effectively to compete with conventional products made from synthetic polymers. Their low tear strength and extensibility as well as lacking transparency and stability are drawbacks which have prevented use of those products on any significant scale.

To overcome the disadvantages and, more particularly, to improve the mechanical properties of starch-based foils, it has been proposed to add to the starch various softeners such as sorbite, glycerine, polyvinyl alcohol and so forth. Another way of improving the mechanical properties of starch-based products of the kind here under consideration is to add synthetic polymers based upon polyolefines. Thus, there is known a biodegradable plastic formed from corn starch and low-density polyethylene. The improvements brought about by such products have not, however, been such as to result in serious alternatives to synthetic polymers.

A further attempt to avoid, or at least lessen, the mentioned drawbacks was made by using so-called special amyloses such as, for instance, chemically modified high amyloses. For instance, certain hydroxyalkyl derivatives of amylose may be processed into thermoplastic articles or foils, films and membranes, or hydroxypropyl starches are added to other polymers, with a view to attaining improvements in predetermined properties. Thus, U.S. Pat. No. 3,850,652 relates to a specific application and teaches a multi-purpose membranous material of high flexibility and mechanical strength formed at least in part of a hydroxypropyl starch. Whilst this multi-purpose membranous material may be non-absorbable by other materials in contact therewith, it is neither transparent nor completely biodegradable.

Hydroxypropyl starches are also utilized for improving the biological degradation behavior of products made from unsaturated hydrocarbon polymer compounds which are difficult to decompose biologically. However, the properties of products thus obtained are by no means satisfactory. Whilst these products may be transparent, they nevertheless display some slight brownish tinge and they are of insufficient mechanical strength. Furthermore, U.S. Pat. No. 3,778,392 describes a mixture of polymeric starch and hyydropropyl starch for use in connection with high-quality papers. These products are not biodegradable and involve comparatively complex manufacturing processes.

As regards their utility, none of the known products derived from starch or amylose have been capable of competing effectively against comparable products made from synthetic polymers. Moreover, in most cases the additives and softeners added to the starch or amylose prevents complete biodegradability of the final product.

OBJECTS OF THE INVENTION

It is an object of the invention to provide foils or products thereof made from starch or amylose derivatives without added synthetic materials.

Another object is to provide foils or products thereof made from starch or amylose derivatives without added softener.

Still another object is to provided foils and the like made from starch or amylose derivatives which are qualitatively significantly superior to known foils of this kind by providing improved physical and mechanical properties.

It is a particular object of the invention to provide foils and the like made from starch or amylose derivatives which are of superior tear strength and extensibility as well as high transparency.

It is also an object of the invention to provide foils and films made from starch or amylose derivatives which may be used as overhead projection slides or printable films.

Yet another object of the invention resides in the provision of foils and films which may be used as surface coatings or laminates of paper and cardboard.

Still further, it is an object of the invention to provide a compound made from starch or amylose derivatives which may be deposited on a surface by spraying, spreading or pouring to form a foil or film thereon.

It is a further object of the invention to provide a compound from starch or amylose derivatives suitable as a surface coating of paper and the like to improve the surface quality thereof.

It is yet another object of the invention to provide a compound derived from starch or amylose derivatives which is completely biodegradable.

Other object will in part be obvious and will in part appear hereinafter.

SUMMARY OF THE INVENTION

In accordance with the invention, there is provided a compound derived from a starch or amylose derivative of low salt content and dissolved in ether, the derivative having a mean molecular weight of between about $10^5$ and about $2 \times 10^7$ g/mol, a degree of substitution between about 0.1 and 0.5, a substantially uniform distribution of substituents between the $C_2/C_3$ and $C_6$ within their glucose unit, a water content of less than 25% under normal climatic conditions, a polydispersity from about 2 to about 8, and a predominantly amorphous structure with a low crystalline proportion and a predominant particle size not greater than 400 nm.

In a further advantageous embodiment of the invention the basic material has an amylose content of not less than 60%.

Other advantageous embodiments will become apparent to those skilled in the art as the description unfolds.

It has surprisingly been found that foils and products made thereof possessing the above parameters and made from pure starch or amylose derivatives without any additives have excellent mechanical properties and a high degree of transparency. Due to the fact that the foils and products made from them do not incorporate any synthetic additives or softeners they are completely biodegradable.

Particularly advantageous results are attained if the basic material, i.e. the starch is derived from the group of high amylose starches and if its amylose content is not less than 60%.

The inventive parameters of the derivative, viz. low salt content, mean molecular weight between about $10^5$ and about $2 \times 10^7$ g/mol, polydispersity of about 2 to about 8, a degree of substitution of 0.1 to 0.5 and preferably from 0.1 to 0.3, substantially uniform distribution of substituents between the $C_2/C_3$ and $C_6$ bond sites within the glucose unit and a low proportion of hard-to-dissolve components are obtained by a careful hydroxypropylation and desalination. Following the hydroxypropylation and desalination the derivative will be a colloidal, viscoelastic solution which may be further processed by known processes such as casting, spraying, spreading and the like into foils and products made thereof with a predominantly amorphous structure of low crystallinity and a mean particle size of 400 nm, below the limits of visibility, the latter being an important requirement for the high degree of transparency of the foil or products made from it. The water content of the foil significantly influences its mechanical properties. Under normal climatic conditions, it is below 25 percent by weight. The foils are of high transparency and, compared to conventional foils and foil products made from starch or amylose derivatives, are of significantly improved stability and extensibility. Owing to the relatively constant water content of the foils or foil products, these properties remained substantially unchanged even after long storage periods at a relative humidity between about 30% and about 70% and at a temperature of about 23° C.

The foils and foil products in accordance with the invention have an internal as well as an external plasticization effect which may on the one hand be ascribed to enlarged spaces between individual macromolecule resulting from the chemical addition of sterically large side groups which lead to increased movability of the polymer chains. On the other hand, it may be ascribed to low molecular groups into which the hydroxypropylated amylose may easily penetrate or physically bonded, thus acting as external softeners. In the present case, the low molecular groups are, in fact, water acting as a softener.

In this connection the starch concentration or overlapping density of starch molecules is of great significance as it determines the way and progress in which the water molecules penetrate or are physically bonded. Thus, the mechanical properties are influenced as well.

Accordingly, the foils or products made thereof in accordance with the invention require no softeners or additives.

This results in a complete biodegradability or compostibility of the foils and products. It also prevents the foils or foil products from becoming brittle. Furthermore, materials in contact with the foil or foil product cannot be detrimentally affected by migration of a softener. The mechanical stability of the foils in the range of relative humidity from about 30 to about 70% at a temperature of about 23° C. is excellent.

The predominantly amorphous structure and a predominant particle size below 400 nm impart excellent optical properties to the foil or foil product. The degree of transmission at light in the range of 560 nm was up to about 93%. The foils are, therefore, especially well suited as overhead projection slides. They may also be used as data carriers for they may be written or printed upon. They may also be used as copy surfaces. The mentioned properties make the foils particularly well suited for ink jet printing. To this end, a surface of a support material may be enhanced or refined by applying to it a coating of an aqueous solution of starch or amylose derivative. Suitable carrier materials are cellulose or other natural fibers. Of course, synthetic support materials may be used as well; but it should be understood that it would probably interfere with the biodegradability of the foil product.

It is also an aspect of the invention to utilize an appropriately constituted starch or amylose derivative in the manufacture of paper and cardboard in order to improve not only their mechanical and optical properties but also their surface characteristics.

Preferably, the foils or film coatings in accordance with the invention have a thickness between about 20 and 200 µm; and their preferred density lies in the range of 1.3 g/cm³.

The properties of the foils and foil products in accordance with the invention may be summarized as follows:

They have a tensile strength >40 Mpa (Megapascal at normal climatic conditions and thus they clearly exceed conventional foils made from starch with a high amylose content as well as 81/15 copolymer lactide/caprolactone (22.0 Mpa) and soft polyvinyl chloride (16–34 MPa);

Their elongation at break is up to 60 Mpa and they are thus superior to low density polyethylene (longitudinal 18–32 Mpa; transversal 16–25 Mpa) as well as medium and high density polyethylene (longitudinal 20–40 Mpa; transversal 15–30 MPa);

Their E module is between about 10 to about 40 MPa;

They possess high transparency (>80% at light of a wavelength of about 560 nm);

They have a high blocking efficiency as regards gases, especially nitrogen and oxygen;

They may be stored at relative humidity levels between about 30% and about 70% at a temperature in the range of about 23° C.;

They are stable against discolorations at temperatures up to 170° C. for 15 minutes;

They may be welded, deep drawn, written, printed or copied upon;

They have excellent adhesive and bonding properties when applied from an aqueous solution onto a carrier material such as, for instance, cellulose or natural fibers, and they markedly improve the surface characteristics thereof; and In preferred embodiments they are free of any softeners or synthetic additives and completely biodegradable as defined by E-DIN 53 739 in view of the fact that they are biological polymers.

Given their mentioned properties, the foils and foil products in accordance with the invention, for specific applications, constitute genuine alternatives to foils or foil products made from synthetic polymers such as polyvinyl chloride, polyethylene or polystyrene. If the foils and foil products are used in connection with other materials, their biodegradability does, of course, also depend upon those other materials.

In order to impart specific properties to the foils or foil products predetermined materials or material systems may be added which are not biodegradable. In such circumstances the complete biodegradability relates only to the foils and foil products in accordance with the invention.

DESCRIPTION OF PREFERRED EMBODIMENTS

The invention will hereafter be described in greater detail on the basis of embodiments.

In the following examples, the basic material is a slightly yellow powder-like starch derived from peas and has:

a water content of about 11.5 percent by weight, it being understood that the water content is a function of storage conditions;

an amylose content of about 77.4%;

a protein content of about 0.9%; and a median molecular weight between about $10^5$ and about $2 \times 10^7$ g/mol.

As is well know and in the context of the invention herein described, amylose may be defined as a sol substituent of starch and consists of straight chain of glucose molecules.

EXAMPLE I

Following hydropropylation with propylene oxide a derivative of pea starch is obtained as a solution which is turbid, colloidal to coarsely dispersive and viscoelastic. The degree of substitution DS of the derivative is DS=0.2 and the degree of molar substitution MS=0.39. Reaction of the propyleneoxide was uniformly carried out with the hydroxyl groups in the $C_2/C_3$ positions and with the hydroxyl groups in the $C_6$ position. The electric conductivity of the low salt content turbid solution was 329 µS/cm. A foil was produced from this homogenous bubble-free solution by a well-known pouring process. Neither softeners nor other additives were added. The foil thus obtained had a layer thickness of 30±2 µm and was brightly transparent. Its light transmissivity at a wavelength of about 560 µm was T=93.2%. An examination of the foil revealed substantially only particles of a size <400 nm, i.e particles below the limits of visibility. 90% of the foil was water soluble and had a median molecular weight of 109000 g/mol with a bimodal molar weight distribution.

The density of the foil at 24° C. and relative humidity of 47% was 1.35 g/cm³. The foil was equilibrated at normal climatic conditions and had a water content of 9.43 percent by weight. Subjecting the foil to heat at 170° C. in a drying chamber for 15 minutes did not result in any visible brown discoloration.

The mechanical parameters of the foil set forth in Table 1 were determined at climatic data of 23/27; 23/50 and 23/70 (°C./relative humidity). Surprisingly, the foil exhibits markedly higher stability values than those of known starch foils without additives. As expected, the tensile and tear strengths increased as relative humidity was reduced. By contrast, the extensibility did not show any unambiguous correlation. While the tensile extensibility is at a maximum value at 37% relative humidity, the tear strength attains its maximum value at 50% relative humidity. The foil can be stored for several months without loss of its qualitative properties at about 20° C. to about 25° C. room temperature and at a relative humidity of about 30 to about 70%. On moist soil, the foil will completely disintegrate within about 1 to about 3 hours. The foil may be written on and is suitable, as a substitute for high-priced polyvinyl alcohol, for dosage packaging or medicinal capsules.

EXAMPLE II

The starch derivative solution of Example I, at a concentration of >20 percent by weight, was applied as a thin layer on a paper or cardboard base and dried thereon. The laminate thus obtained had a surface with a shiny surface and was well suited as a printing surface for ink jet printers.

EXAMPLE III

A foil with a thickness of 90±8 µm was formed by casting a starch derivative solution made in accordance with Example I without adding softeners or other additives. The foil was brightly transparent and, at a wavelength of about 560 nm, its transmissivity was about T=92.7%. The median molecular weight of the foil was 2,158,000 g/mol at a bimodal molar weight distribution.

The foil which was equilibrated under normal climatic conditions was found to have a water content of 10.87 percent by weight. The mechanical parameters of the foil contained in the table were determined at climatic data of 23/37, 23/50 and 23/70 (° C./relative humidity).

As in the case of Example I, the foil was found to have strength values markedly superior to conventional starch foils without additives.

The foil could be stored for several months without loss of its qualitative properties. On moist soil it was found completely to disintegrate earth within 1 to 3 hours.

The foil could be written or printed on by several media. It could also be fed through a printer or copier and, therefore, it was suitable for use as overhead projection slides. It was found to be of particular advantage in connection with ink jet printers.

After suitable preconditioning the foil was also suitable for deep drawing or thermoforming. Such processes did not result in loss of the high degree of transparency of the foil. The foil is particularly well suited as a biodegradable blister material.

TABLE 1

| Sample | Clime | Casting Direction | Thickness [μm] | Tensile Strength | Extensibility Eps (Fmax) [%] | Tear Strength [Mpa] | Tear Extens. [%] | Module Max. [Mpa/%] | L-Module Max. [%] |
|---|---|---|---|---|---|---|---|---|---|
| Ex. 1 | 23/37 | transverse | 31 | 53.74 | 6.58 | 41.60 | 13.98 | 24.52 | .63 |
|  |  | longitudin. | 30 | 50.54 | 6.38 | 39.65 | 8.95 | 24.51 | .35 |
|  | 23/50 | transv. | 30 | 46.42 | 4.50 | 28.81 | 19.92 | 25.34 | .55 |
|  |  | longit. | 29 | 46.27 | 4.41 | 31.53 | 13.65 | 25.39 | .43 |
|  | 23/70 | transv. | 32 | 36.13 | 4.91 | 21.51 | 12.42 | 18.40 | .60 |
|  |  | long. | 30 | 33.74 | 3.82 | 24.41 | 5.59 | 17.90 | .77 |
| Ex. 3 | 23/37 | transv. | 86 | 57.19 | 7.02 | 47.79 | 12.25 | 26.37 | .31 |
|  |  | long. | 86 | 55.80 | 6.49 | 44.38 | 8.88 | 26.37 | .18 |
|  |  | transv. | 90.4 | 44.32 | 4.71 | 30.60 | 16.81 | 22.93 | .26 |
|  |  | long. | 90.2 | 43.60 | 4.67 | 28.49 | 13.66 | 22.83 | .20 |
|  |  | transv. | 98 | 43.55 | 4.79 | 25.57 | 16.09 | 22.46 | .28 |
|  |  | long. | 98 | 41.95 | 5.47 | 28.89 | 18.71 | 20.89 | .43 |

What is claimed is:

1. A plastic foil made from a solution of a starch, wherein the solution is of low salt content and the starch comprises:
   at least 60% of amylose having a plurality of glucose molecules;
   a median molecular weight between about $10^5$ to about $2 \times 10^7$ g/mol;
   a degree of substitution from about 0.1 to about 0.5;
   a substantially uniform substituent distribution between the $C_2/C_3$ and $C_6$ bond sites of a glucose molecule;
   a polydispersity from about 2 to about 8;
   a predominantly amorphous structure of low crystalline proportion and particles of a size not exceeding 400 nm.

2. The plastic foil of claim 1, comprising a water content of less than 25 percent by weight water content unit under predetermined climatic conditions.

3. The plastic foil of claim 2, wherein the climatic condition includes a temperature of about 23° C. and relative humidity from about 27% to about 70%.

4. The plastic foil of claim 1, wherein the starch contains at least about 77% of amylose.

5. The plastic foil of claim 4, wherein the solution comprises a hydroxypropyl ether.

6. The plastic foil of claim 5, wherein the foil has a transmissivity of light of a wavelength of about 560 nm in excess of 80%.

7. The plastic foil of claim 6, wherein the light transmissivity is 93.2%.

8. The plastic foil of claim 7, wherein the foil has a thickness of from about 20 μm to about 200 μm.

9. The plastic foil of claim 8, wherein the foil has a density of about 1.3. g/cm$^3$.

10. The plastic foil of claim 9, comprising at least one surface adapted for image formation.

11. The plastic foil of claim 1, wherein the foil is formed by casting the solution on a surface.

12. The plastic foil of claim 1, wherein the foil is formed by spraying.

* * * * *